June 9, 1953 — C. H. BOLIN — 2,641,213

AUTOMATIC STEERING SYSTEM

Filed July 19, 1945 — 9 Sheets-Sheet 1

INVENTOR
CARLETON H. BOLIN
BY James E. Sproll
ATTORNEY

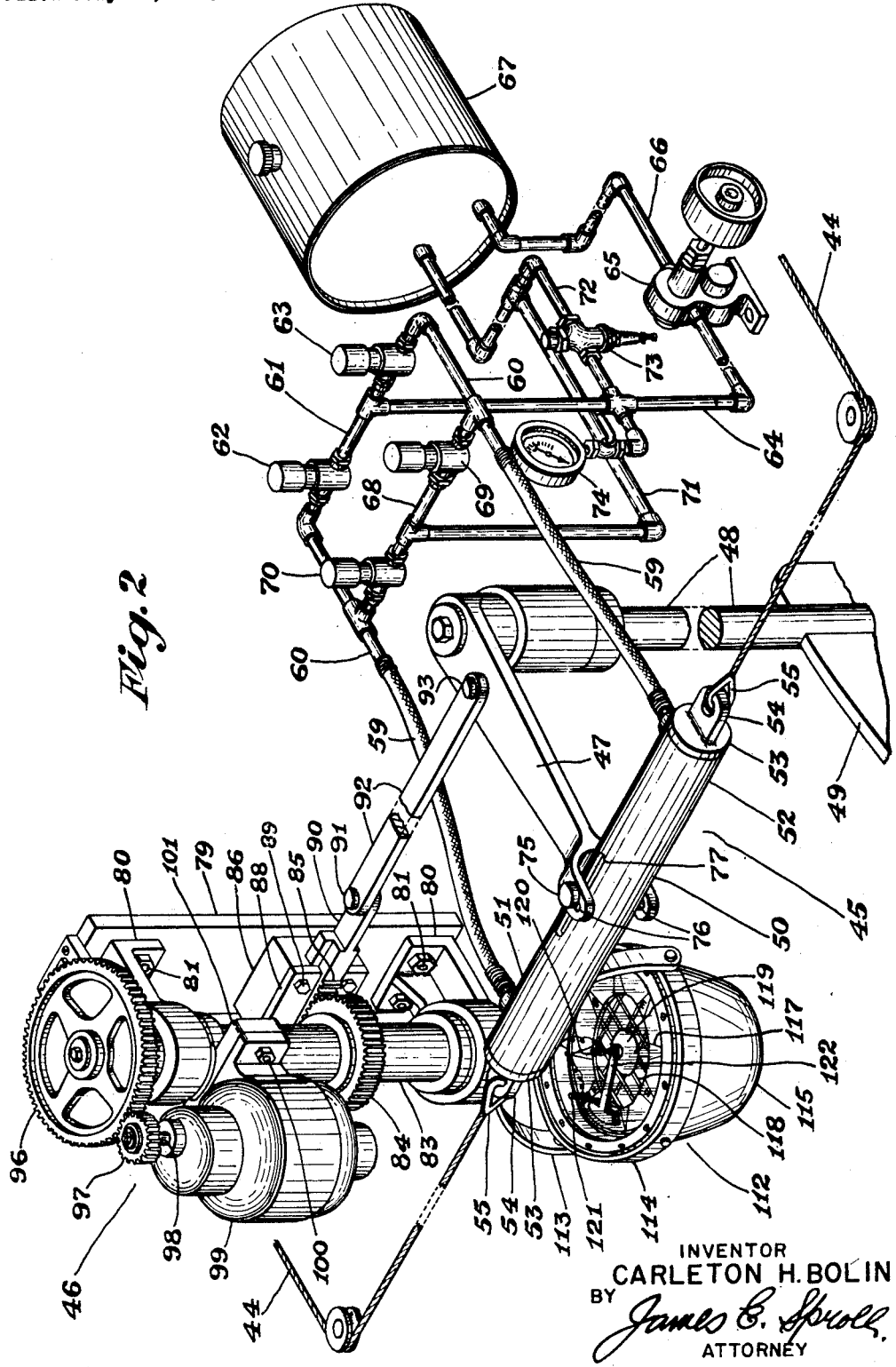

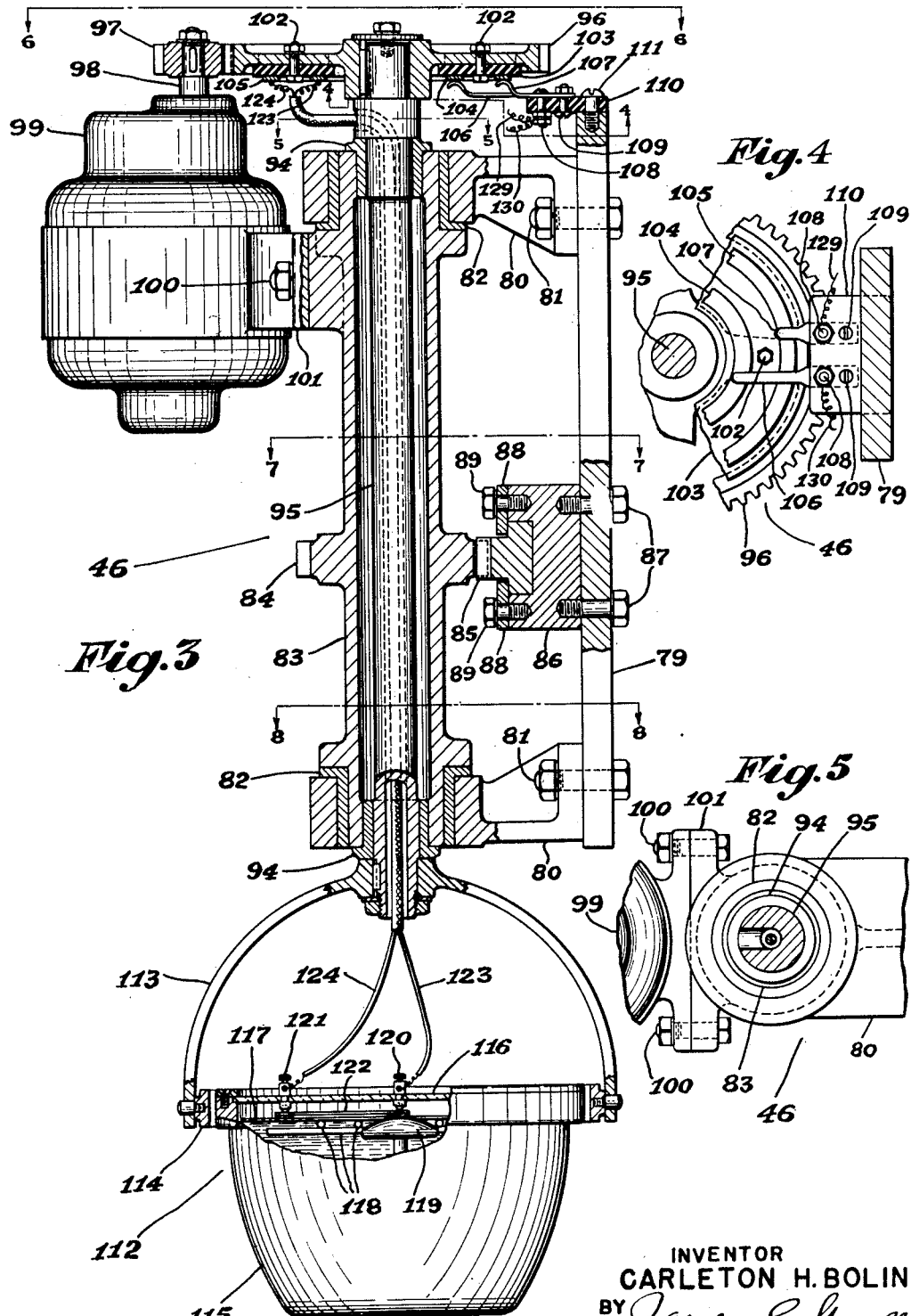

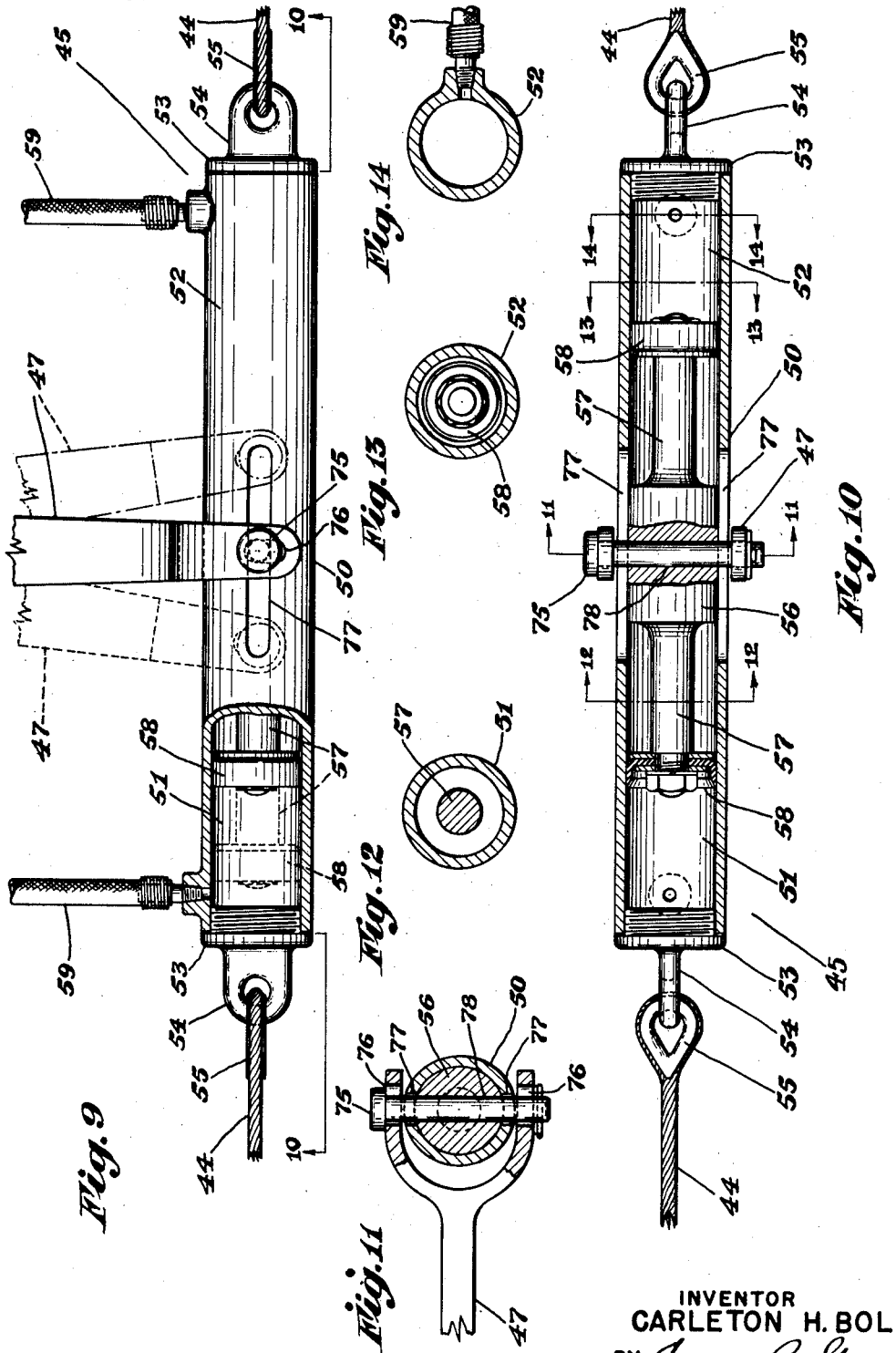

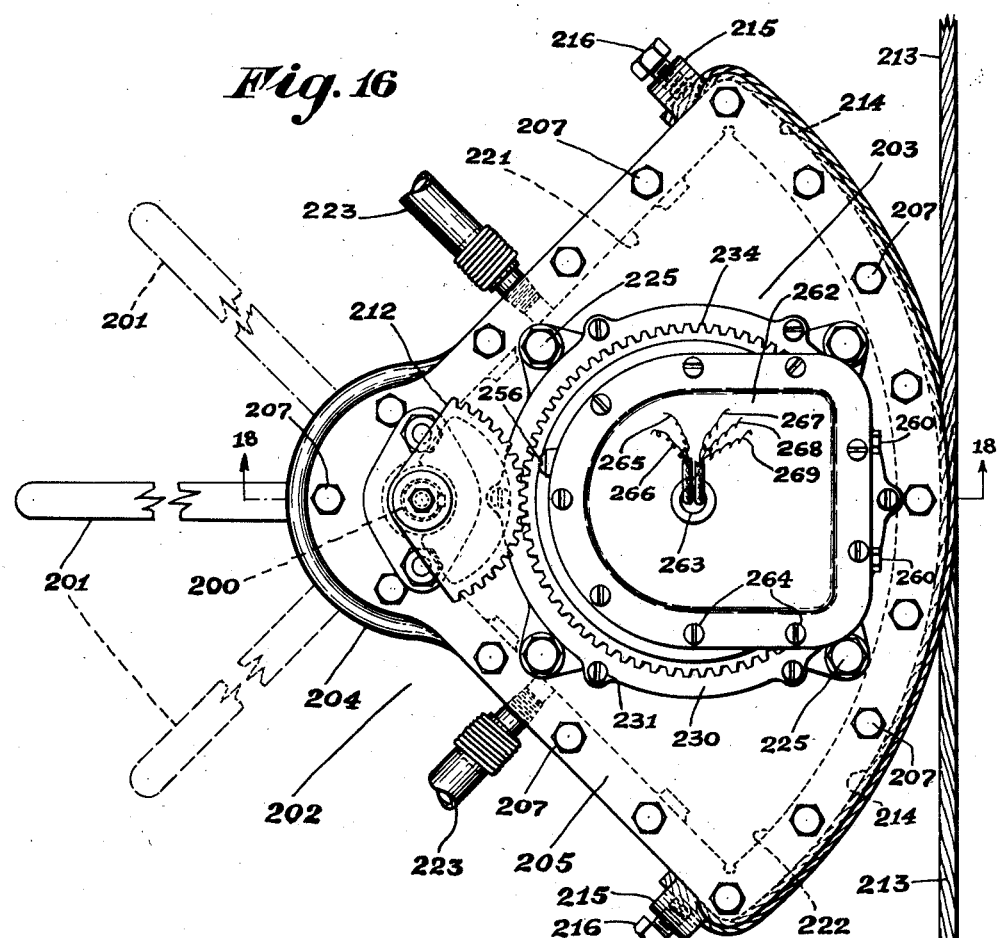
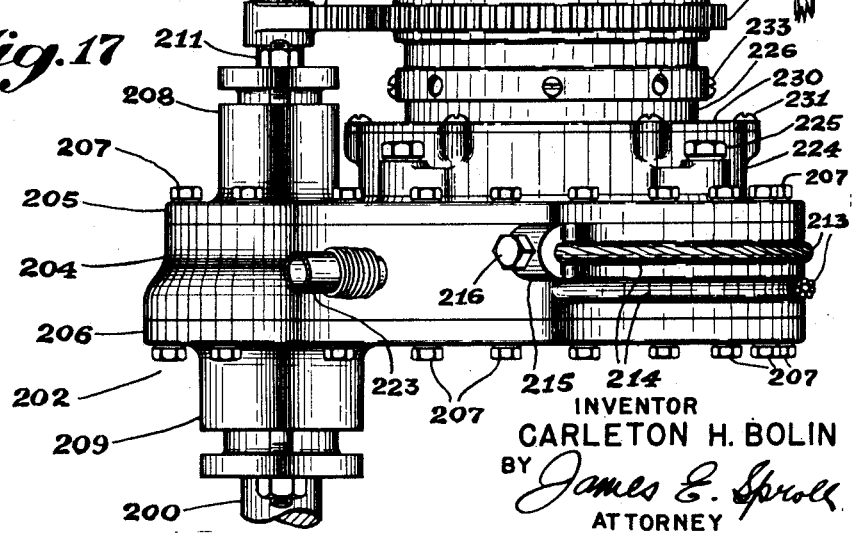

June 9, 1953 C. H. BOLIN 2,641,213
AUTOMATIC STEERING SYSTEM
Filed July 19, 1945 9 Sheets-Sheet 7
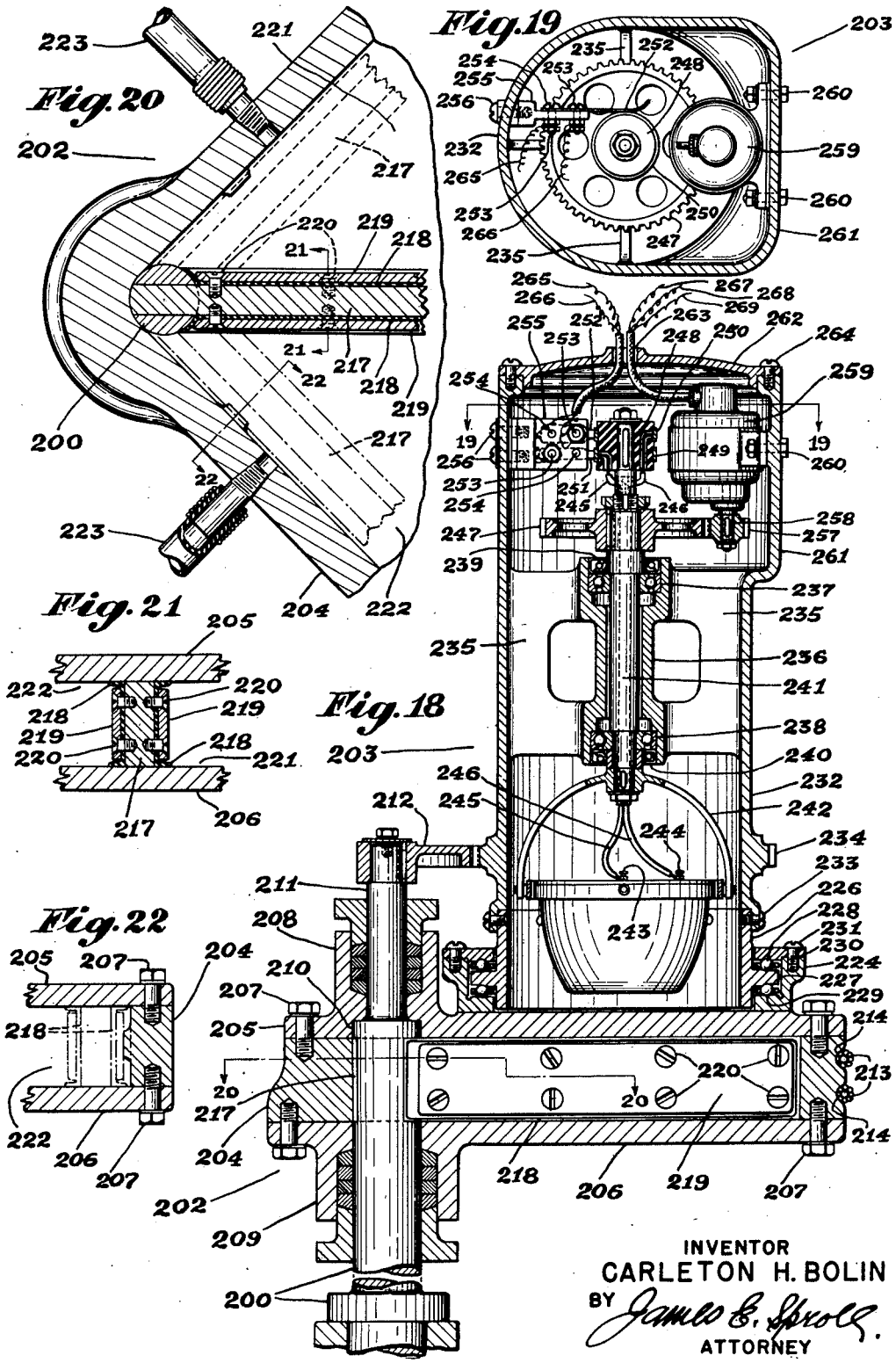
INVENTOR
CARLETON H. BOLIN
BY James E. Sproll
ATTORNEY

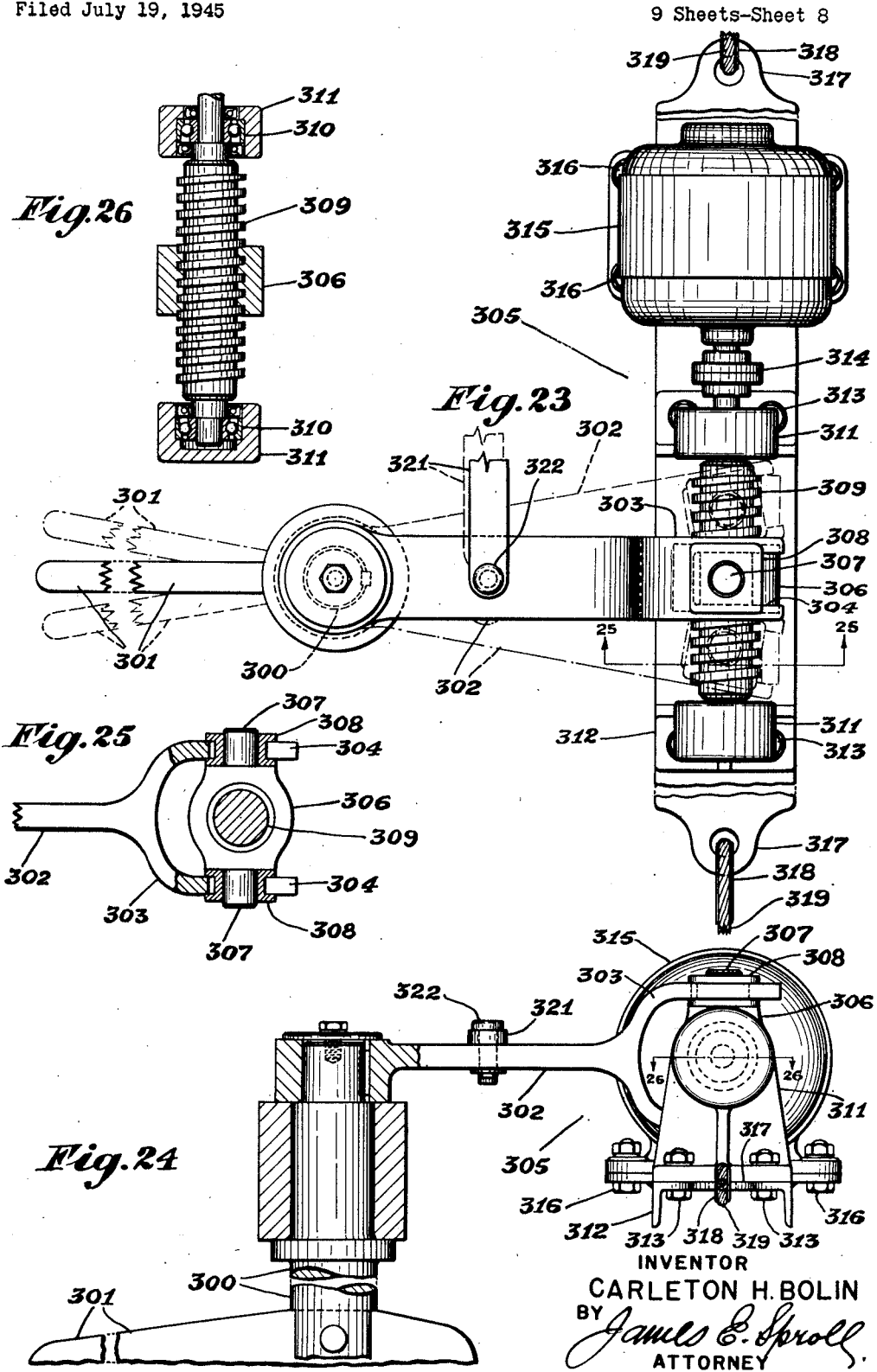

June 9, 1953 C. H. BOLIN 2,641,213
AUTOMATIC STEERING SYSTEM
Filed July 19, 1945 9 Sheets-Sheet 9

INVENTOR
CARLETON H. BOLIN
BY *James C. Sproll*
ATTORNEY

Patented June 9, 1953

2,641,213

UNITED STATES PATENT OFFICE 2,641,213

AUTOMATIC STEERING SYSTEM

Carleton H. Bolin, Seattle, Wash.; Jessie R. Bolin, executrix of said Carleton H. Bolin, deceased Application July 19, 1945, Serial No. 605,992

16 Claims. (Cl. 114—144)

This invention relates to automatic steering systems for steerable craft having rudders, such as aircraft and water craft, and aims primarily to provide an improved system for automatically steering such a craft over a predetermined or set course and for accurately and positively maintaining the same thereon regardless of adverse weather conditions.

Broadly contemplated by the present invention is the provision of an automatic steering system, wherein the rudder of the related craft is continuously oscillated in a comparatively short arc of travel, such as a maximum of approximately ten degrees (10°) each side of its neutral or amidships position, and wherein such rudder oscillation is utilized for effecting continuing rudder oscillation.

Another object of the invention is the provision of an automatic steering system adaptable for either electrical or electro-mechanical operation.

A further object of the invention is the provision of a combined automatic and manual steering system, wherein manual steering may be resorted to regardless of whether the automatic steering means is active or inactive.

A still further object of the invention is the provision of an automatic steering system wherein a predetermined course may be rapidly and expeditiously set or changed.

A still further object of the invention is the provision of a combined automatic and manual steering system, wherein the automatic steering means may be rendered inactive to permit prolonged or protracted manual steering periods, following which automatic steering may be resumed and the related craft will automatically return to its course without re-orientation or new course setting.

A still further object of the invention is the provision of an automatic steering system, which will automatically and quickly return its related craft to its proper course when the same has been moved in azimuth by extraneous forces.

A still further object of this invention is the provision of an automatic steering system embodying automatic means for imparting to the rudder of its related craft continuous oscillations of lesser amplitude and manual means for simultaneously imposing upon the rudder oscillations of greater amplitude.

A still further object of the invention is the provision of a combination steering system, adaptable for automatic power steering, manual power steering, and manual steering.

With the foregoing in view, the invention essentially resides and is more particularly concerned in the provision of an automatic steering system, which in its preferred embodiment is characterized by the employment of power means for continuously oscillating the rudder of the related craft thereof; an oscillating direction device or pilot compass adapted to be oscillated by the rudder; an electrical control unit adapted to be electrically connected to and to be successively energized and de-energized by the direction device, whereby the power means is reversely actuated to impart oscillatory motion to the rudder.

As now contemplated and comprehended by this invention, the power means above mentioned may be either fluid pressure or electrically actuated; the direction device or pilot compass may be located in juxtaposition to the rudder or remotely therefrom, but in either case is interconnected therewith to receive oscillations therefrom, also said direction device may be either automatically or manually operated for course setting or course changing purposes, all of which are to be correlated in the broad aim of enhancing the efficiency of the automatic steering system for the uses and purposes for which it is primarily designed and intended.

The above, and additional objects which will hereinafter be more specifically treated are attained by such means as are shown in the accompanying drawings; described in the following specification and then more clearly pointed out in the claims, which are appended hereto and form part of this application.

With reference to the drawings, in which there are illustrated several embodiments of the invention, and throughout the several views of which like characters of reference designate similar parts:

Fig. 2 is an isometric view of the automatic steering system, as it would appear detached from its related craft;

Fig. 3 is a vertical medial section, taken on the line 3—3 of Fig. 1, of the directional mechanism for controlling the power steering apparatus, certain parts being shown in elevation for clarity of illustration;

Fig. 4 is a fragmentary inverted horizontal section taken on the line 4—4 of Fig. 3;

Fig. 5 is a fragmentary horizontal section taken on the line 5—5 of Fig. 3;

Figure 1:
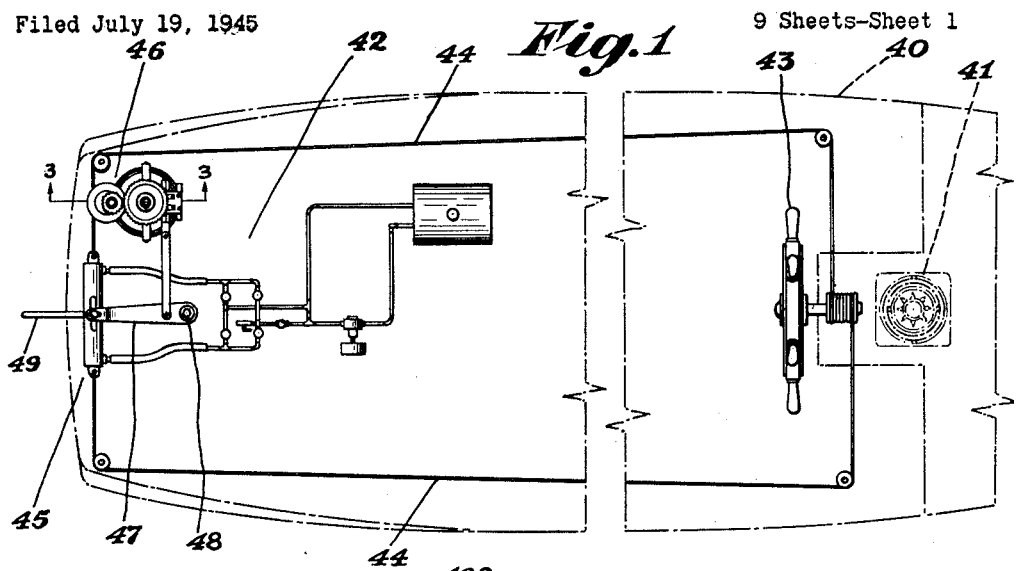
Figure 1 is a plan view of an automatic steering system comprehended by the present invention, as it would appear when operatively installed within its related craft, which latter is shown in dot and dash lines for clarity of illustration.
Figure 6:
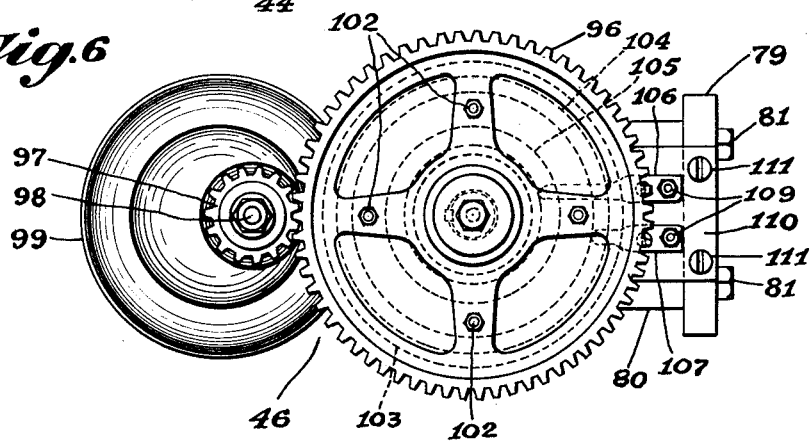
Fig. 6 is a top plan view taken on the line 6—6 of Fig. 3.
Figure 8:
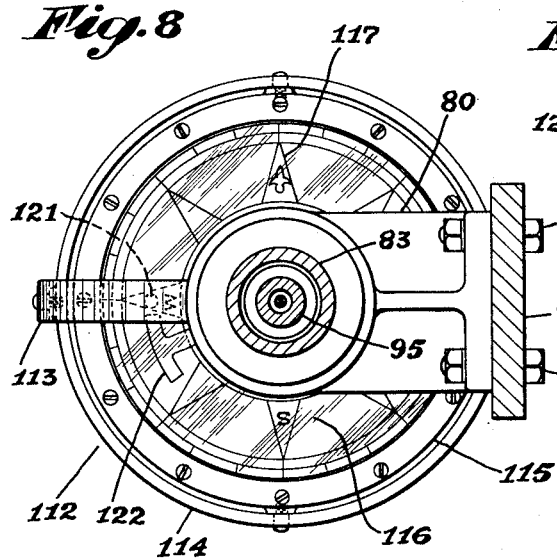
Figure 7:
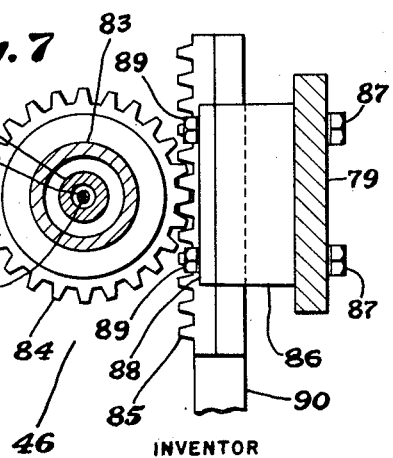
Figure 15:
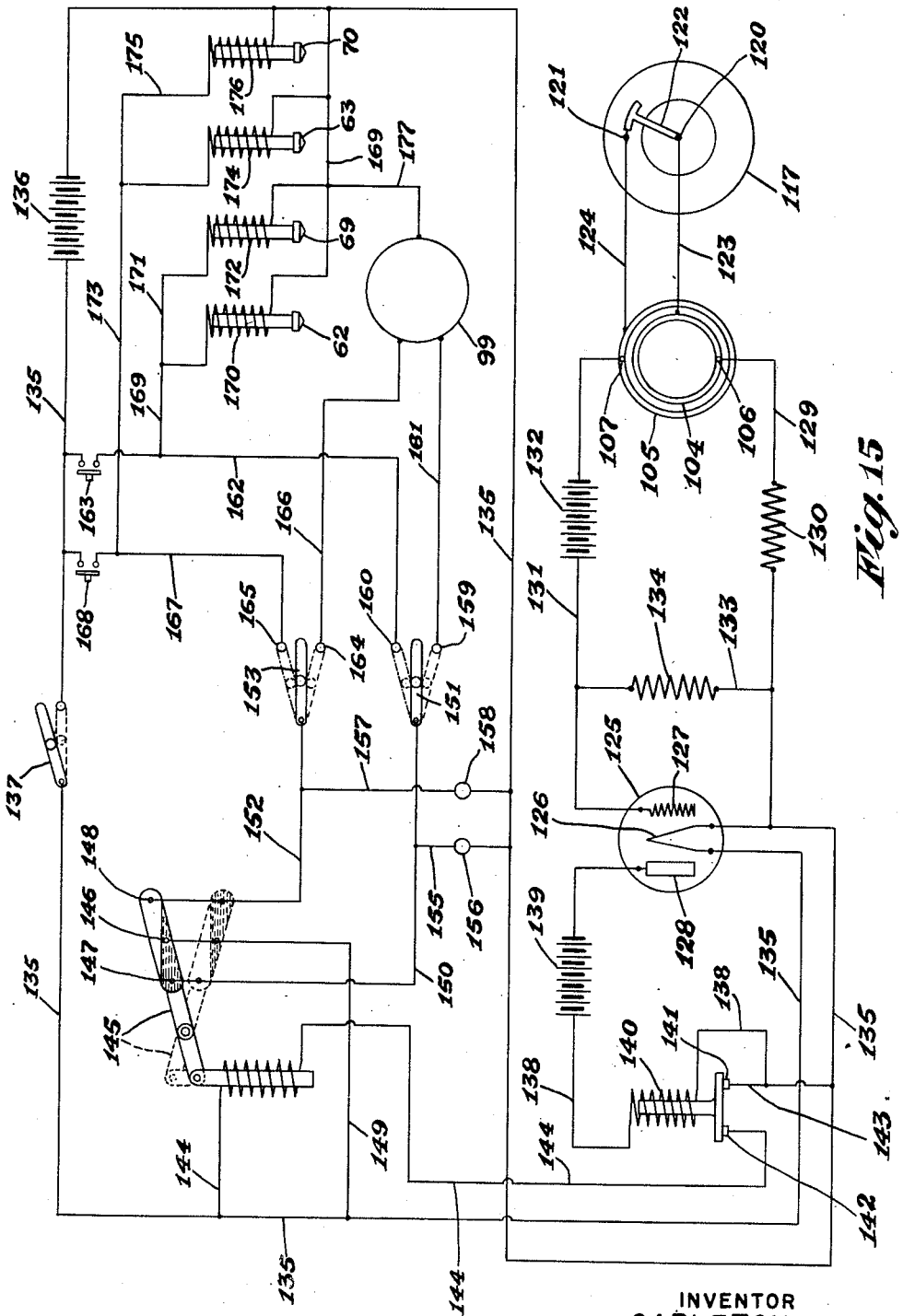
Figure 27:
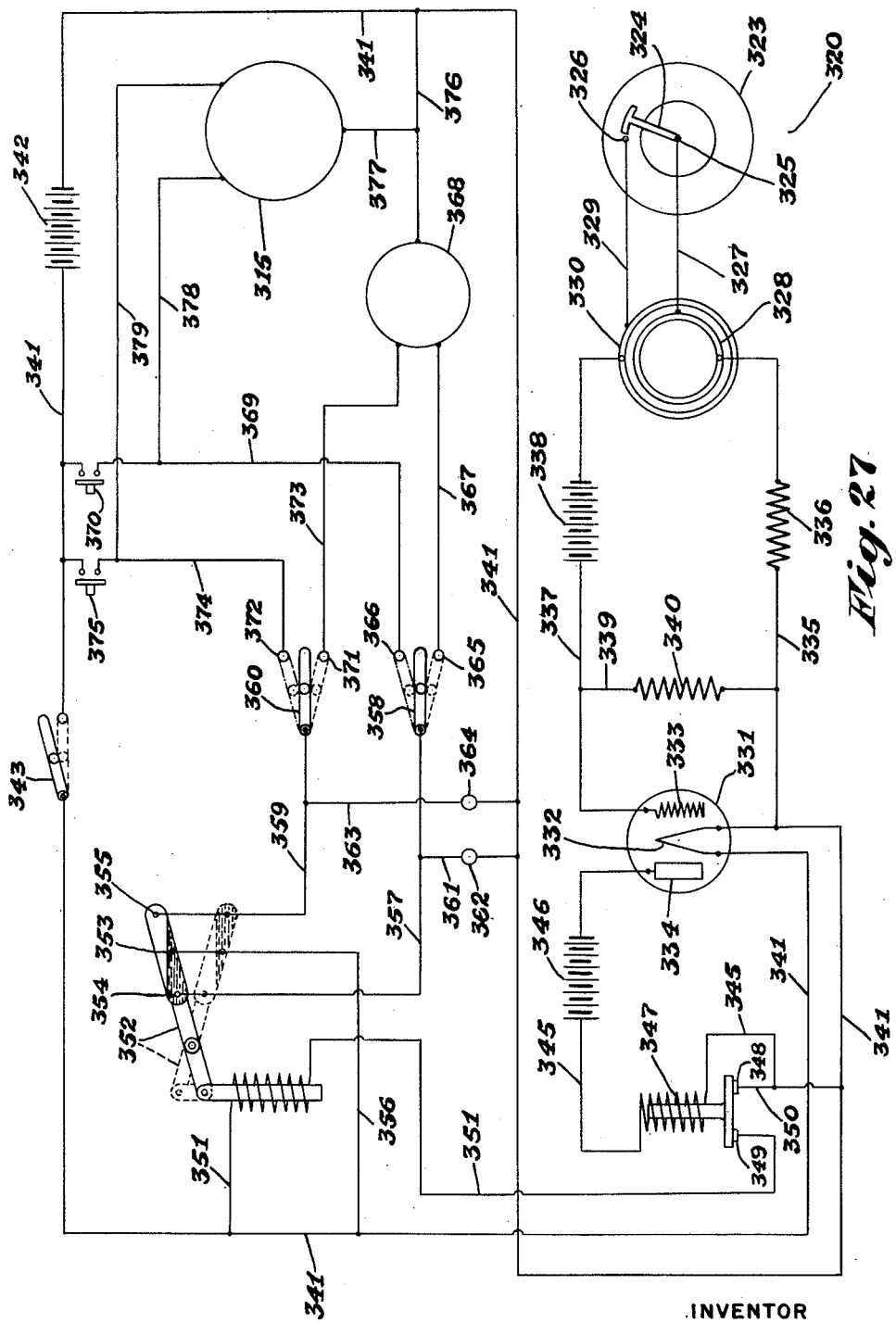

Figs. 7 and 8 are fragmentary horizontal sections taken, respectively, on the lines 7—7 and 8—8 of Fig. 3;

Fig. 9 is an enlarged fragmentary top plan view of the power steering apparatus, certain parts being shown in section for clarity of illustration;

Fig. 10 is a vertical longitudinal axial section of same taken on the line 10—10 of Fig. 9;

Figs. 11, 12, 13 and 14 are vertical transverse sections taken, respectively, on the lines 11—11, 12—12, 13—13 and 14—14 of Fig. 10;

Fig. 15 is a diagrammatic view of the electrical circuits and apparatus of the automatic steering system shown in Fig. 1;

Fig. 16 is a top plan view of a slightly modified type of directional and power steering apparatus for my automatic steering system;

Fig. 17 is a fragmentary side elevation of the same;

Fig. 18 is a vertical medial section taken on the line 18—18 of Fig. 16;

Fig. 19 is a horizontal section taken on line 19—19 of Fig. 18;

Fig. 20 is an enlarged fragmentary horizontal section taken on line 20—20 of Fig. 18;

Figs. 21 and 22 are fragmentary vertical sections taken, respectively, on the lines 21—21 and 22—22 of Fig. 20;

Fig. 23 is a top plan view of another modified type of automatic steering system comprehended by the present invention;

Fig. 24 is a side elevation of the same with certain parts being shown in vertical axial section for clarity of illustration;

Fig. 25 is a fragmentary vertical transverse section taken on the line 25—25 of Fig. 23;

Fig. 26 is a fragmentary horizontal section taken on the line 26—26 of Fig. 24; and Fig. 27 is a diagrammatic view of the electrical circuits and apparatus of the automatic steering system shown in Fig. 23.

Beginning now the more detailed description of the invention by referring more particularly to Figs. 1 to 15, inclusive, of the accompanying drawings, in Fig. 1 of which is shown in dot and dash lines the outline of a craft or vessel 40 provided with the usual binnacle 41, said craft being equipped with one type of automatic steering system of the instant invention designated generally by the numeral 42 and embodying a steering wheel 43 connected by steering cables 44 to a power steering unit 45, which in turn is operatively connected to and controlled by a directional mechanism 46, and is similarly connected by a tiller arm 47 to a rudder post 48 having a rudder 49 fixedly secured to the lower end portion thereof.

Coming first to a more detailed description of the power steering unit 45 shown in Figs. 2 and 9 to 14, inclusive, wherein the numeral 50 designates a tubular member the end portions of which form and provide power steering cylinders 51 and 52, respectively, said tubular member 50 being normally closed at its ends by threaded caps 53, to the apertured ears 54 of which are attached the thimbled stern ends 55 of the steering cables 44. Mounted for reciprocation within the tubular member 50, intermediate the cylinders 51 and 52 is a crosshead 56, from the ends of which extend, within the cylinders 51 and 52, respectively, piston rods 57 having fluid pressure actuated pistons 58 secured to their outer ends, which pistons are reciprocable within the cylinder 51 and 52 aforesaid, and are preferably of the well known flexible cup type generally employed in fluid pressure cylinders. Connected to the cylinders 51 and 52 adjacent their outer ends for supplying fluid pressure thereto are flexible pipes or hose 59, which latter at their opposite ends are connected to pipes 60, the other ends of which are interconnected by a transversely disposed fluid pressure supply pipe 61 having solenoid actuated inlet valves 62 and 63, respectively, interposed therein. Connected to the pipe 61, at a point between the valves 62 and 63, and extending downwardly therefrom is a fluid pressure supply pipe 64, which is connected at the other end thereof to the discharge side of a rotary pump 65 adapted to be belt-driven from a source of power, not shown. A pipe 66 connects the suction side of the pump 65 with a fluid or oil storage tank 67. Bridging or connecting the pipes 60, at points intermediate their length, is a transversely disposed fluid pressure exhaust pipe 68 having solenoid actuated outlet valves 69 and 70, respectively, interposed therein. Connected to the pipe 68 at a point between the valves 69 and 70 and extending downwardly therefrom is a fluid pressure exhaust pipe 71, which is connected at its other end to the fluid storage tank 67. Connected at one end to the fluid pressure supply pipe 64 and at its opposite end to the fluid pressure exhaust pipe 71 is a pipe 72 having a pressure regulating valve 73 interposed therein, whereby excess fluid pressure is exhausted into the tank 67. Also connected to the fluid pressure supply pipe 64 is a pressure gauge 74.

The tiller arm 47 is adapted to be pivotally connected to the crosshead 56, as by a pivot pin 75, see Fig. 10, and for this purpose the forward end of said tiller arm is bifurcated to normally straddle the mid-length portion of the tubular member 50, as more clearly shown in Fig. 2, said bifurcated end having slots 76 formed therein and said mid-length portion having diametrically opposed slots 77 formed in the walls thereof, which conjointly with a diametrically disposed hole 78 provided in the crosshead 56 permit mounting of the pivot pin 75 therein, whereby reciprocative movement of said crosshead is imparted as oscillative movement to the tiller arm 47 for effecting steering of the craft, as hereinafter more fully described.

Coming now to a more detailed description of the directional mechanism 46 shown in Fig. 2 and Figs. 3 to 8, inclusive, wherein the numeral 79 designates a panel which is rigidly secured, in any well known manner, not shown to a fixed part of the vessel, such as a hull frame, bulkhead, or the like, and mounted upon said panel in fixed vertical spaced relation are brackets or bearings 80, which latter are secured thereto by bolts 81, said brackets at their outer bossed ends being provided with bushings 82, wherein are mounted the shouldered end portions of a vertically disposed oscillative sleeve 83, said sleeve, at a point substantially midway its length, having a spur gear 84 integrally formed thereon, or otherwise fixedly secured thereto, which normally meshes with a rack 85 slidably mounted in a guide 86 fixedly secured, as by cap screws 87, to the panel 79, said rack being maintained in said guide by retaining plates 88, which latter are secured thereto by cap screws 89. The reduced terminal portion 90 of the rack 85, see Fig. 2, is pivotally connected by a pin 91 to one end of a link 92, the other end of which is similarly connected by a pin 93 to the tiller arm 47, at a point thereon adjacent to the rudder stock 48. From the foregoing description, and by referring to Fig. 2, it will be manifest and apparent that the operating link 92 serves and functions to operatively interconnect the power steering unit 45 with the directional mechanism 46, whereby oscillative movement of the tiller arm 47 and the sleeve 83 is simultaneously effected for a reason and purpose hereinafter made more apparent.

The vertically disposed oscillative sleeve 83 is provided at its ends with bushings 94, within which is mounted, adjacent its ends, a vertically and concentrically disposed oscillative hollow shaft 95, to the upper projecting end of which is keyed a spur gear 96 normally meshing with a spur pinion 97 keyed to the shaft 98 of a course orienting, or setting reversible electric motor 99 fixedly secured, as by bolts 100, to a flanged extension 101 integrally formed upon the sleeve 83 contiguous to the upper journal thereof. The reversible electric motor 99 is preferably of extremely low fractional horsepower and has incorporated in its construction suitable speed reducing gears, not shown. Fixedly secured by bolts 102 to the underside of the spur gear 96 is an annular disc of insulation 103, upon the underside of which are mounted slip rings 104 and 105, respectively, and normally in contact with the latter are resilient fingers 106 and 107, respectively, which are fixedly secured by terminal screws 108 and round-headed bolts 109 to a block of insulation 110 mounted upon the upper edge of the panel 79 and fixedly secured thereto by round-headed screws 111.

Mounted upon the lower projecting end of the vertically disposed hollow shaft 95 is a pilot compass 112, the bail 113 of which is keyed to said lower projecting end, said bail having a gimbal ring 114 oscillatively mounted in its ends, within which ring is similarly mounted the weighted bowl 115 of the compass, said bowl being broken away in Fig. 3 to show the compass glass cover 116 and the compass card 117 with its correlated compass needles 118 and pivotally mounted float 119, all of which are of well known construction and in consequence require no further detailed description. Seated in the glass cover and extending therethrough is an axially aligned binding post 120 and similarly seated in and extending through said cover in spaced relation to the post 120 is another binding post 121. Suitably mounted upon the compass card 117, in insulated relation therefrom, is a substantially T-shaped member or conductor 122, the inner end of which is in contact at all times with the binding post 120, while the outer T-shaped end of same is adapted to intermittently contact the binding post 121 during oscillations of the compass bowl 115, as will be apparent and manifest. Connected to the binding posts 120 and 121 are the lower ends of wires or leads 123 and 124, respectively, which latter extend upwardly through the hollow shaft 95 and emerge therefrom at a point below the spur gear 96, for connection at their upper ends to the slip rings 104 and 105, respectively, all as more clearly shown in Fig. 3.

From the foregoing description taken in connection with the accompanying drawings, it will be noted, that the compass bowl 115 receives oscillative motion from two sources: (First) during course setting and course changing periods, from the reversible electric motor 99, through the spur pinion 97, spur gear 96, hollow shaft 95 and the bail 113; and (second) during steering periods from the oscillating tiller arm 47 through the link 92, rack 85, spur gear 84, sleeve 83, de- energized motor 99, spur pinion 97, spur gear 96, hollow shaft 95 and the bail 113.

In the diagrammatic view of the electrical circuits and apparatus shown in Fig. 15, the numeral 125 designates an amplifying or vacuum tube having a filament 126, a grid 127 and a plate 128. The slip ring 104 is connected to one terminal of the filament 126 by a wire 129 having a resistance coil 130 interposed therein, while the slip ring 105 is connected to the grid 127 by a wire 131 having a battery 132 interposed therein to furnish electrical energy or voltage for said grid 127. Bridging the wires 129 and 131, at points thereon intermediate the filament 126 and resistance 130 of the wire 129 and the grid 127 and battery 132 of the wire 131, is a wire 133 having a grid resistor 134 interposed therein.

Connected to the wire 129, adjacent the amplifying tube 125, is one end of a power supply circuit 135, the other end of which is connected to the opposite terminal of the filament 126, thereby completing the circuit for the latter, all as more clearly shown in Fig. 15, said power supply circuit 135 having a battery 136 and a main or master switch 137 interposed therein, said battery 136 constituting the source of electrical energy for the solenoid actuating valves 62, 63, 69 and 70, also the reversible electric motor 99. The plate 128 of the amplifying tube 125 is connected to the power supply circuit 135, as by a wire 138 having a battery 139 and a sensitive relay 140 in circuit therewith, said battery being adapted to furnish voltage for the plate 128. The sensitive relay 140 is provided with contacts 141 and 142, respectively, the former being connected by a wire 143 to the wire 138, while the latter is connected to the power supply circuit 135 by a wire 144 having a solenoid actuated mercury rocker switch 145 interposed therein, which switch is provided with a central terminal 146 also inner and outer terminals 147 and 148, respectively. Said center terminal is adapted to be immersed in the mercury at all times and is connected by a wire 149 to the power supply circuit 135. The inner terminal 147 of the mercury switch 145 is connected by a wire 150 to the central or pivotal pole of a selector switch 151, while the outer terminal 148 of said mercury switch is connected by a wire 152 to a similar pole of a selector switch 153. Bridging the power supply circuit 135 and the wire 150 is a wire 155 having an indicator or tell-tale light 156 interposed therein, and similarly bridging the power supply circuit 135 and the wire 152 is a wire 157 also provided with an indicator light 158.

The selector switch 151 is provided with contacts 159 and 160, respectively, the former being connected to the reversible pilot compass motor 99 by a wire 161, while the latter is connected to the power supply circuit 135 by a wire 162 having a two-point make push button switch 163 interposed therein. The selector switch 153 is similarly provided with contacts 164 and 165, respectively, the former being also connected to the reversible pilot compass motor 99 by a wire 166, while the latter is also connected to the power supply circuit 135 by a wire 167 similarly provided with a two-point make push button switch 168.

The numeral 169 designates a wire connecting the power supply circuit 135 with the wire 162, said wire 169 having a solenoid 170 interposed therein for effecting periodic actuation of the fluid pressure inlet valve 62. Connected at its ends to the wire 169, at a point intermediate the control wire 135 and the solenoid 170 and also at a point intermediate said solenoid and the wire 162, is a wire 171 having a solenoid 172 interposed therein for effecting periodic actuation of the fluid pressure exhaust or outlet valve 69 simultaneously with the actuation of the inlet valve 62. Connected at one end to the wire 167 and at its opposite end to the wire 169 is a wire 173 having a solenoid 174 interposed therein for periodically actuating the fluid pressure inlet valve 63. Tied into the wire 173, at a point thereon intermediate the wire 167 and the solenoid 174, is one end of a wire 175, the other end of which is tied into the power supply circuit 135, said wire 175 having a solenoid 176 interposed therein for periodically actuating the fluid pressure exhaust or outlet valve 70 simultaneously with the actuation of the inlet valve 63. To complete the circuit of the reversible pilot compass motor 99, a wire 177 is provided which connects said motor to the wire 169.

For a clearer and readier understanding of the functions of the various units of the electrical apparatus just described, it may be well to state: (1) the pilot compass 112 is the directional device which automatically controls the power steering means of the system, and the reversible electric motor 99 carried by said pilot orients the compass bowl 115 to the desired course and/or is used when changing from one course to another, but aside from these uses such motor does not operate; (2) the amplifying or vacuum tube 125, the sensitive relay 140 and the rocking solenoid mercury switch 145 form and constitute a control unit, whereby the relatively minute current flowing through the electrical contacts of the pilot compass 112 is amplified until it is of sufficient magnitude to successively operate the solenoid actuated inlet and exhaust valves 62, 63, 69 and 70; (3) The selector switches 151 and 153 in one of their closed positions direct current to the motor 99 for orienting or course setting purposes and in their other closed position direct current to the solenoid valves 62, 63, 69 and 70 during automatic steering periods; (4) The push button switches 163 and 168 are provided for manual controlled power steering, as and when desired, the switch 163 being adapted to actuate the solenoid valves 62 and 69, while the switch 168 actuates the solenoid valve 63 and 70; (5) The tell-tale or indicator lights 156 and 158 serve to indicate when orientation of the pilot compass 112 is completed, and also serve to indicate proper functioning of the solenoid valves 62, 63, 69 and 70 during automatic steering periods; and (6) The master switch 137 in the power supply circuit 135 obviously renders the automatic steering system active or inactive.

In the present automatic steering system, the master switch 137, the selector switches 151 and 153, the push button switches 163 and 168, and the tell-tale lights 156 and 158 are preferably assembled or mounted on a control panel, not shown, which latter is located in the most accessible and convenient position for the operator, while the control unit comprising the amplifying tube 125, the sensitive relay 140 and the solenoid mercury switch 145 is located in any available space on the craft.

In the operation of the automatic steering system herein shown and described, the pump 65, which is normally driven by the main engine of the related craft, is started to build up the oil pressure in the system to the setting of the pressure regulating valve 73, the craft meanwhile being manually steered, by the wheel 43, until it is approximately on the predetermined course, at which time the pilot compass bowl 115 is oriented to said course by closing the master switch 137 and by closing the selector switches 151 and 153 in the motor position, all as indicated by dotted lines in Fig. 15, whereupon current flows to the reversible motor 99 causing it to rotate the compass bowl 115 until the binding post 121 carried thereby makes contact with the T-shaped conductor 122, on the compass card 117, thus completing orientation of the compass bowl 115. However, closing of the circuit by the post 121 and the conductor 122, actuates and rocks the solenoid mercury switch 145 causing reverse rotation of the motor 99 and the compass bowl 115, thus opening the circuit, by breaking contact between the post 121 and the conductor 122, which again causes rocking of the solenoid mercury switch 145 and reverse rotation of the motor 99 and the compass bowl 115 until the binding post 121 again contacts the conductor 122, thus completing a cycle of operation, a series of succession of which sets up oscillatory motion of the compass bowl 115 through a few degrees of arc, which motion will continue until the selector switches 151 and 153 are moved to the steering position indicated in dot and dash lines in Fig. 15.

With the selector switches 151 and 153 in the steering position above mentioned, current will flow either to the solenoids 170 and 172 of the inlet and exhaust valves 62 and 69, or to the solenoids 174 and 176 of the inlet and exhaust valves 63 and 70, depending upon the position of the solenoid mercury switch 145. However, for purposes of the present description it is assumed that said switch is in the position indicated in full lines of Fig. 15, in which event, the solenoids 170 and 172 will be energized and their correlated inlet and exhaust valves 62 and 69 will be fully open, thereby admitting fluid pressure to the power steering cylinder 51 and simultaneously therewith displacing the fluid in the power steering cylinder 52 and exhausting same to the fluid storage tank 67, the resultant movement of the pistons 58 and their correlated crosshead 52 swings the tiller arm 47 to starboard, thereby longitudinally moving the link 92 and the rack 85 in the same direction, thus causing partial rotation of the gear 84 and its correlated sleeve 83, which rotation is transmitted, in a manner hereinbefore described, to the pilot compass bowl 115, whereat the T-shaped conductor 122 contacts the post 121, thus reversing the solenoid mercury switch 145 and in consequence de-energizing the solenoids 170 and 172 to close the inlet and exhaust valves 62 and 69, and coincidently therewith energizing the solenoids 174 and 176 to fully open the inlet and exhaust valves 63 and 70, thereby admitting fluid pressure to the power steering cylinder 52 and displacing the fluid in the power steering cylinder 51 and exhausting same to the fluid storage tank 67, the resultant movement of the pistons 58 and the cross-head 52 swings the tiller arm to port, with the consequent longitudinal movement of the link 92 and rack 85 in the same direction, thus reversely rotating the gear 84, sleeve 83 and pilot compass bowl 115 causing breaking of contact between the T-shaped conductor 122 and the post 121, thereby reversing the solenoid mercury switch 145 with the resultant de-energizing of the solenoids 174 and 176 and the re-energizing of the solenoids 170 and 172, thus completing a full cycle of operation. Obviously, therefore, repetition of such a cycle sets up continuous oscillation of the tiller arm 47 and its correlated rudder 49, which oscillation will continue as long as desired.

Should some external force, such as a wave, wind, tide rip, or the like, tend to change the course of the craft, or move the same in azimuth, the pilot compass 112 will cause the solenoid valves then operating to remain open, thereby prolonging pressure upon the related piston, thus temporarily suspending normal and uniform rudder oscillations, in order to turn or move the rudder 49 a greater number of degrees in the direction necessary to return the craft to its original course setting.

When it is desired to change the course, for any reason, one of the selector switches 151 or 153 is moved from its steering position to its motor position, to energize the motor 99 for orienting the pilot compass 112 upon the new course, or in effect turning said compass through an angle equal to the desired change in course, following which the affected selector switch is returned to its steering position, thus de-energizing the motor 99.

From the foregoing description and by referring to the accompanying drawings, it will be manifest and apparent, that the operator may at any time change the course of the craft by resorting to manual steering, as for example, the steering wheel 43 may be turned sharply to port or starboard, to avoid hitting a floating object, this without affecting or disturbing the automatic steering action in any way, and when the course has been changed sufficiently to avoid such object the former course may be resumed by returning the steering wheel 43 to its midposition.

In the event a protracted or prolonged departure from the set course is desired during which execution of various maneuvers are contemplated with an eventual return to the original course, the master switch 137 is first opened to render the automatic steering system inactive, the various maneuvers are then carried out manually with the steering wheel 43, and upon completion of same the latter is returned to its mid-position, following which the master switch 137 is closed to again render the automatic system active. Since the orientation of the pilot compass 112 was not changed, either before or during the aforesaid maneuvers, the craft will automatically resume its previous set course.

Should the operator desire to resort to manual power steering, for any reason, the master switch 137, and the selector switches 151 and 153 are opened, after which the operator presses either the push-button switch 163 to energize the solenoids 170 and 172 or the push-button switch 168 to energize the solenoids 174 and 176. Pressing of the switch 163 causes the tiller arm 47 and the rudder 49 to swing to starboard, while pressing of the switch 168 causes said arm and rudder to swing to port. Manifestly, during manual power steering periods no continuous or uniform oscillative movement of the rudder 49 is produced, as obtains during automatic steering periods, inasmuch as the operator presses the push-buttons 163 and 168 only when the occasion demands.

In the present automatic steering system, timing of the oscillation cycle, and the amplitude of rudder oscillation, may be readily varied according to the type of craft within which it is installed, as for example, by raising or lowering the oil pressure and/or by changing the location of the pivot pin 93 on the tiller arm 47. Further, it should also be noted and observed, a complete or closed cycle of operation obtains in the present system, i. e., the power steering unit 45 oscillates the tiller arm 47 and rudder 49, and in turn the tiller arm oscillates the pilot compass 112 of the directional unit 46, which compass in turn energizes the control unit, by and through which actuation of the power steering unit 45 is regulated.

While I have herein shown and described the pilot compass 112 as being located in close proximity to the tiller arm 47 for oscillation thereby, through the pinion 84 and rack 85, I desire to have it understood, that such arrangement is merely by way of illustration, inasmuch as such pilot compass may be remotely located from said tiller arm, while still being operatively connected thereto, in any well known manner, for oscillation thereby. In this connection, it may be stated, in some instances, it has been found desirable in practice to locate the pilot compass 112 in the pilot house of the related craft, in which event, the reversible electric motor 99 may be dispensed with and the pilot compass oriented by hand.

In the present disclosure I have shown and described the automatic steering system as being hydraulically operated, but I desire to have it understood that such system may be and is readily adapted for operation by air, steam or vacuum.

In the slightly modified type of directional and power steering apparatus of my automatic steering system shown in Figs. 16 to 22, inclusive, the numeral 200 designates a rudder post, to the lower end portion of which is fixedly secured, in any well known manner, a rudder 201, and upon the upper end portion of which is operatively mounted the combined power steering unit 202 and directional mechanism 203 of the automatic steering system hereinafter described.

The power steering unit 202 essentially consists of a quadrant-shaped casing or housing 204, open at its upper and lower ends, which latter are normally closed and sealed by similarly shaped top and bottom covers 205 and 206, respectively, and are adapted to be fixedly secured thereto, as by cap screws 207, said top and bottom covers being provided with stuffing boxes 208 and 209, respectively, substantially in the manner illustrated in Fig. 18. In the present construction, it is to be noted that the casing 204 and its correlated covers 205 and 206 are mounted upon the rudder stock 200 for free oscillative movement thereon, and in this connection, it should also be noted, that the upper shouldered end of the main body portion of said rudder stock normally seats within an axially aligned recess 210 formed within the inner face of the top cover 205, from which the reduced upper end portion 211 of the rudder stock 200 extends upwardly through the stuffing box 208, said portion 211 having upon its outer or projecting end a toothed quadrant or segmental gear 212 keyed or otherwise fixedly secured thereto, for a purpose hereinafter more fully set forth.

The power steering unit 202 is adapted to be connected to the vessel's steering wheel, not shown, as by steering cables 213, the crossed aft or stern end portions of which normally seat respectively within vertically spaced peripheral grooves 214 formed in the arcuate or curvilinear end of the casing 204, see Figs. 16, 17 and 18, and wherefrom the terminals of said cables extend through eyes 215 integrally formed upon the radially disposed sides of the casing 204 and are clamped therein by cap screws 216.

Rigidly seated at one end within the rudder stock 200 and extending radially therefrom for free or independent oscillative movement within the casing 204 is a fluid pressure actuated vane 217 provided upon the sides thereof with fluid pressure sealing means consisting of rectangular dish-shaped flexible sealing members 218, fabricated from rubber, neoprene or other suitable composition, said members being fixedly secured or clamped upon the sides of the vane 217 and maintained in sealing relation with the rudder stock 200, the casing 204 and its correlated covers 205 and 206 by rectangular retaining plates 219 and flathead machine screws 220, see Figs. 20 and 21, wherein it will also be noted, that the rudder stock 200 conjointly with the vane 217 divide the interior of the casing 204 into port and starboard fluid pressure chambers 221 and 222, respectively, which are connected by flexible pipes or hose 223 to any suitable source of fluid pressure and controls therefor, not shown, whereby oscillative movement of the vane 217 within and relative to the casing 204 is effected.

Coming now to a more detailed description of the directional mechanism 203 which, in the present instance, in order to provide an extremely compact automatic steering apparatus is preferably mounted upon or combined with the power steering unit 202, substantially in the manner illustrated in Fig. 18, said directional mechanism 203 having a vertically disposed base housing 224 adapted to be centrally disposed upon the upper face of the top cover 205 and to be fixedly secured thereto by cap screws 225. Rotatively and concentrically mounted within the base housing 224 is the lower portion of a cylindrical journal 226 having an integral peripheral flange 227 adapted to be normally interposed for rotation between upper and lower ball bearing rings 228 and 229, respectively, also concentrically mounted within said housing 224, said journal and ball bearing rings being maintained in operative relation within the housing 224 by a retaining ring plate 230 fixedly secured to the upper face of same by round-head machine screws 231.

Concentrically seated at its lower internally shouldered end upon the upper end of the cylindrical journal 226 and extending upwardly therefrom in axial prolongation thereto is a cylindrical casing or housing 232, which casing is fixedly secured to said journal for rotation therewith, as by round-head screws 233. Integrally formed upon the periphery of the cylindrical casing 232 adjacent the lower end thereof is a spur gear 234 adapted to normally mesh with the toothed quadrant 212, whereby oscillative movements of the rudder stock 200 and the cylindrical casing 232 is simultaneously effected for a purpose hereinafter set forth.

Concentrically disposed within cylindrical casing 232, substantially midway the height thereof, and integrally connected thereto, as by ribs or webs 235, is a sleeve 236, within the enlarged upper and lower ends of which are housed ball bearings 237 and 238, respectively, with their related oil seals 239 and 240, respectively. Journalled for rotation in the bearings 237 and 238 is a vertically disposed hollow shaft 241, upon the lower projecting end of which is keyed, or otherwise fixedly secured, a pilot compass 242 identical in construction and function to that hereinbefore shown and described for the pilot compass 112, and in consequence is provided with a central binding post 243 and a second binding post 244 spaced therefrom, corresponding to the binding posts 120 and 121, respectively, of said pilot compass 112. Connected to the binding posts 243 and 244 are the lower ends of wires or leads 245 and 246, respectively, which wires extend upwardly through the hollow shaft 241 and emerge therefrom, at a point intermediate a spur gear 247 and an insulating cylinder 248, both of which are keyed, or otherwise fixedly secured, in vertical spaced relation to the upper projecting end of said hollow shaft 241, all as more clearly shown in Fig. 18, said insulating cylinder 248 having slip rings or conducting bands 249 and 250, respectively, mounted or seated upon the periphery thereof in vertical spaced relation, to which slip rings the upper ends of the wires 245 and 246 are respectively connected.

Normally in contact with the slip rings 249 and 250 are resilient fingers or brushes 251 and 252, respectively, which are fixedly secured by terminal screws 253 and round-head machine screws 254 to an insulating base 255 fixedly secured by round-head machine screws 256 to the interior of the cylindrical casing 232 adjacent the upper end thereof and in the horizontal plane of the insulating cylinder 248.

Normally in mesh with the spur gear 247 is a spur pinion 257 keyed to the shaft 258 of a reversible electric motor 259 fixedly secured, as by bolts 260 to the interior of the upper offset squared portion 261 of the cylindrical casing 232, see Fig. 18. The reversible electric motor 259 is preferably of extremely low fractional horsepower and has incorporated in its construction suitable speed reducing gears, not shown.

The cylindrical casing 232 is provided at its upper offset squared end with a similarly shaped cover or closure 262 having an opening 263 formed therein, wherethrough the several electrical wires or conduits of the directional mechanism 203 are adapted to pass, all as more clearly illustrated in Figs. 16 and 18, said cover 262 being fixedly secured to said casing 232 by round-head machine screws 264.

The power steering unit 202, in the present instance, is preferably equipped for hydraulic operation with the same fluid pressure supply system including the solenoid actuated inlet and outlet valves, as that shown in Fig. 2 and hereinbefore described for the power steering unit 45, also the directional mechanism 203 similarly is preferably equipped with the same electrical circuits and apparatus, as that shown in Fig. 15 and hereinbefore described for the directional mechanism 46, hence the wires 265 and 266, respectively, connected through the terminal screws 253 to the resilient fingers 251 and 252, correspond to the wires 129 and 131 shown in Fig. 15, and the wires 267, 268 and 269, respectively, connected to the reversible electric motor 259 correspond to the wires 161, 166 and 177 connected to the reversible motor 99, all as shown in Fig. 15.

In the operation of the slightly modified type of automatic steering system above described, the pilot compass 242 is oriented by the reversible electric motor 259, in the identical manner and for the same purpose as that hereinbefore described for the orientation of the pilot compass 112 by the reversible electric motor 99. As obtains in the previously described system, following compass orientation, fluid pressure is alternately admitted to and exhausted from each side of the quadrant-shaped casing 204 for effecting oscillation of the vane 217 therein and relative thereto, such oscillation being directly imparted to the rudder stock 200 and hence to the rudder 201 and the toothed quadrant 212, which latter meshing with the spur gear 234 effects oscillation of its related cylindrical casing 232, and such cylindrical oscillations are imparted to the pilot compass 242, in an obvious manner, to thereby effect make and break contact of the post 244 with its related conductor member, thus energizing and deenergizing the control unit of the system and in turn alternately actuating the solenoid valves of said system for alternately admitting fluid pressure to and exhausting the same from each side of the quadrant-shaped casing 204, whereby continuing oscillation of the vane 217 is effected during automatic operation periods.

It will be manifest and apparent from the foregoing description taken in connection with the accompanying drawings, that the slightly modified form of automatic steering system is capable and adaptable for performing all the functions of the system previously shown and described, such as, automatic power steering, manual power steering, and manual steering. The particular advantages of this slightly modified type of automatic steering system is that it is more compact and takes up much less space in its related craft, where in most instances space is at a premium.

In another modified type of directional and power steering apparatus of my automatic steering system shown in Figs. 23 to 27, inclusive, the numeral 300 designates a rudder post having a rudder 301 fixedly secured to the lower end portion thereof and having a tiller arm 302 similarly secured to the upper end of same, said tiller arm having a bifurcated forward end 303 provided with longitudinally disposed slots 304 open at their outer ends, as shown more clearly in Fig. 25.

In Fig. 23 the numeral 305 generally designates the electrically operated power steering unit of the system, said unit having a travelling nut 306 adapted to be straddled by and operatively connected to the bifurcated forward end 303 aforesaid, and for this purpose said nut is provided with trunnions 307 journalled for oscillation in grooved bushings 308 slidably mounted within the slots 304 of said bifurcated end 303. The travelling nut 306 is mounted upon and threadedly engages a screw-shaft 309 journalled in anti-friction bearings 310 housed in vertically disposed brackets 311 fixedly secured to a channel-shaped support member 312, as by bolts 313. The screw-shaft 309 at one end extends through its related bearing 310, whereat it is connected by a coupling 314 to reversible electric motor 315 for rotation thereby, said motor being also fixedly secured to the channel-shaped member 312, as by bolts 316. The channel-shaped support member 312 is provided at its ends with apertured ears 317, to which are attached the thimbled stern ends 318 of steering cables 319 connected at their forward ends to the vessel's steering wheel, not shown.

The power steering unit 305 is adapted to be operatively connected to a directional mechanism 320, which latter is shown diagrammatically in Fig. 27, and for purposes of this disclosure is substantially identical in construction and function, as the directional mechanism 46 hereinbefore shown and described. In the present instance the power steering unit 305 is specifically interconnected with the directional mechanism 320 by a link 321 pivotally connected at one end, as by a pin 322, to the tiller arm 302, at a point thereon substantially midway the length thereof, and to be connected at its opposite end, not shown, to the directional mechanism 320 in the identical manner to that herein shown and described for the link 92 interconnecting the power steering unit 45 and directional mechanism 46.

In Fig. 27 are diagrammatically illustrated the electrical circuits and apparatus for the modified type of electrically operated type of automatic steering system, which circuits and apparatus are substantially identical to those shown in Fig. 15 and hereinbefore described for the fluid pressure actuated types of automatic steering systems, with this exception that the reversible electric motor 315 is substituted for the solenoid actuated inlet and outlet valves 62, 63, 69 and 70, hence, the numeral 323 designates a compass card carrying a T-shaped conductor member 324 in insulated relation therefrom, and the numerals 325 and 326, respectively, designate binding posts mounted in their correlated compass glass, not shown, in the same manner as hereinbefore described for the binding posts 120 and 121, said binding post 325 being normally in contact with the inner end of the T-shaped member 324, while the outer arcuate end of said member intermittently contacts the binding post 326 during oscillations of the pilot compass 320. The binding post 325 is connected by a wire or lead 327 to a slip ring 328, while a wire 329 connects the binding post 326 with a slip ring 330.

The numeral 331 designates a vacuum tube having a filament 332, a grid 333 and a plate 334. A wire 335 having a resistance 336 connects the slip ring 328 with one terminal of the filament 332, while a wire 337 having a battery 338 in circuit therewith connects the slip ring 330 with the grid 333, which latter receives electrical energy from the battery 338. A bridge wire 339 having a grid resistor 340 connects the wires 335 and 337 at points thereon intermediate the filament 332 and resistance 336 of the wire 335 and the grid 333 and the battery 338 of the wire 337.

The numeral 341 designates the power supply circuit connected at one end to the wire 335 adjacent to the vacuum tube 331 and at its other end is connected to the opposite terminal of the filament 332, thus completing the circuit of the latter, said power supply circuit having a battery 342, and a main or master switch 343 interposed therein, said battery being provided for supplying electrical energy for the power steering motor 315.

The plate 334 of the vacuum tube 331 is connected to the main wire 341 by a wire 345 having a plate voltage battery 346 and a relay switch 347 in circuit therewith. The relay switch is provided with contacts 348 and 349, respectively, the former being connected to the wire 345 by a wire 350, while the latter is connected to the main wire 341 by a wire 351 having a solenoid actuated mercury rocker switch 352 interposed therein, said switch having a central terminal 353 also inner and outer terminals 354 and 355, respectively. The central terminal 353 is adapted to be immersed in the mercury at all times and is connected to the main wire 341 by a wire 356, while the inner terminal 354 is connected by a wire 357 to the pivotal pole of a selector switch 358, and the outer terminal 355 is connected by a wire 359 to the similar pole of a selector switch 360. A bridge wire 361 having an indicator or tell-tale light 362 connects the main wire 341 with the wire 357, and a bridge wire 363 having a similar light 364 connects the main wire 341 with the wire 359.

The selector switch 358 is provided with contacts 365 and 366, respectively, the former being connected by a wire 367 to a low fractional horsepower reversible electric motor 363, of the pilot compass, not shown, while the latter is connected to the main wire 341 by a wire 369 having a two-point make push button switch 370 in circuit therewith. The selector switch 360 is similarly provided with contacts 371 and 372, respectively, the former being connected by a wire 373 to the reversible pilot compass motor 368, while the latter is connected to the main wire 341 by a wire 374 similarly provided with a two-point make push button switch 375. The reversible pilot compass motor 368 is also connected by a wire 376 to the main wire 341, whereby said motor receives electrical energy from the battery 342.

The motor 315 of the power steering unit 305 is connected by a wire 377 to the wire 376, whereby it also receives electrical energy from the battery 342, said motor being also connected by a wire 378 to the wire 369 and by a wire 379 to the wire 374, so that the circuit of same is completed when the switch 358 bridges the contact 366 and the switch 360 bridges the contact 372.

In view of the fact that the construction and operation of the electrical apparatus shown in Fig. 27 is identical to that shown in Fig. 15, with the exception of the power steering motor 315 and its correlated tiller arm oscillating mechanism, it is thought that a description of the operation of the latter will suffice for a ready understanding of the operation of the modified type of automatic steering system last described.

During automatic steering periods, the power steering motor 315 is continuously and reversely rotated, causing the swivel nut 306 to reciprocate upon the reversely rotating screwshaft 309, thus causing oscillation of the tiller arm 302 and rudder 301, which oscillation is transmitted by the link 321 to the pilot compass 320 for effecting continuing reverse rotation of the motor 315.

The above described automatic steering system is also adaptable for hand power steering and manual steering, the last mentioned during either active or inactive periods of automatic steering.

In conclusion, it should be carefully noted and observed, that a highly important feature of the present invention, which is common to the several automatic steering systems herein disclosed, is the imparting to the related craft rudder continuous oscillations of lesser amplitude, and coincidentally therewith imposing upon said rudder oscillations of greater amplitude.

Manifestly, therefore, the automatic steering systems of the present invention, in any of the forms herein disclosed, are comparatively simple and inexpensive, are easy to install, are capable of accurate steering and do not require any special skill or qualification on the part of the operator.

While I have herein shown and described the invention with sufficient detail to enable those skilled in the art to understand the mode of construction and the principles involved, it is to be understood that there is no intentional limitation herein to the specific forms and precise details of construction of the invention shown and described except as expressly defined by the appended claims, and it is further understood that various modifications of such construction may be resorted to without departing from the spirit of the invention or the benefits derivable therefrom.

What I claim as my invention and desire to secure by Letters Patent, is:

1. The combination with a steerable craft having a rudder and a rudder stock, of automatic steering means comprising a tiller arm fixedly secured at one end thereof to said rudder stock; a fluid pressure power cylinder operatively supported adjacent the opposite end of said tiller arm; a reciprocative piston in said cylinder adapted to be connected to said tiller arm for continuously oscillating the same; fluid pressure means for actuating said piston; fluid pressure control valves interposed in said supply means; a magnetic pilot compass having a compass bowl interconnected with and continuously oscillated by said tiller arm; course orienting means for said compass bowl; electrical contact means carried by said compass bowl and operable upon orientation of the same; an electrical control unit in circuit with said contact means whereby said unit is successively energized and de-energized during periods of compass bowl oscillation for effecting sequential actuation of the fluid pressure control valves aforesaid, and means operable both during active and inactive automatic steering periods for manually steering the craft.

2. In an automatic steering system for a steerable craft having a rudder; fluid pressure actuated power steering means connected to the rudder for continuously oscillating said rudder; an oscillative magnetic compass directly connected to said rudder for continuous oscillation thereby; and electrical control means including electrically operated valve means connected with and responsive to the oscillations of said magnetic compass for regulating the direction of fluid pressure flow to said power steering means whereby continuous oscillations are imparted to the rudder connected therewith.

3. In an automatic steering system for a steerable craft having a rudder; fluid pressure actuated power steering means connected to the rudder for continuously oscillating said rudder; a source of fluid pressure including pressure regulating means; an oscillative magnetic pilot compass directly connected to said rudder for continuous oscillation thereby; and electrical control means including a sensitive relay connected with and activated and deactivated by the oscillations of said magnetic pilot compass, a back contact relay activated and deactivated by said sensitive relay and electrically operated valve means activated and deactivated by said back contact relay for regulating the direction of fluid pressure flow from said source to said power steering means whereby continuous oscillations are imparted to the rudder connected therewith.

4. The combination, in an automatic steering system for a steerable craft having a rudder, of power steering means connected to said rudder; directional means directly connected to said rudder for automatically activating said power steering means to effect continuous rudder oscillation; manual means connected to the power steering means for activating said power steering means to actuate said rudder: and means connected to said rudder for effecting additional manual actuation thereof.

5. In an automatic steering system for a steerable craft having a rudder; power steering means connected to said rudder; automatic means for activating said power steering means whereby substantially uniform oscillations of a relatively minor amplitude are continuously impressed upon said rudder to normally hold the craft upon its course; means for manually activating said power steering means whereby movements of greater amplitude are impressed upon the rudder and are superimposed upon said minor amplitude oscillations; and manual means connected to said rudder for impressing thereon movements of major amplitude simultaneously with said minor amplitude oscillations.

6. In an automatic steering system for a steerable craft having a rudder, comprising power steering means directly connected to said rudder for imparting thereto continuous oscillations to effect automatic power steering of the craft; directional means including an oscillative magnetic pilot compass connected to and operable by the continuously oscillating rudder for activating and controlling said power steering means while the craft is being automatically steered; and manually operable steering means functionally connected to the rudder through the agency of said power steering means for effecting manual steering of the craft independently of or simultaneously with the functioning of the power steering means of the same.

7. The combination as defined in claim 6, in which the directional means includes course setting and changing means for the oscillative magnetic pilot compass.

8. In an automatic steering system for a steerable craft having a rudder, comprising power steering means directly connected to said rudder for imparting thereto continuous oscillations to effect automatic steering of the craft; directional means including an oscillative magnetic pilot compass connected to and operable by the continuously oscillating rudder; an electric controlling unit associated with and responsive to the oscillations of said magnetic pilot compass whereby said power steering means while the craft is being automatically steered is reversely activated for effecting continuous oscillation of the craft rudder; and manually operable steering means functionally connected to the rudder through the agency of said power steering means for effecting manual steering of the craft either independently of or simultaneously with the functioning of the power steering means of the same.

9. The combination as defined in claim 8, in which the directional means also includes reversible mechanism connected to the oscillative magnetic pilot compass for orienting the latter to the desired course and for changing from one course to another.

10. The combination as defined in claim 8, in which the directional means also includes a reversible electric motor connected to the oscillative magnetic pilot compass for orienting the latter to the desired course and for changing from one course to another.

11. The combination as defined in claim 8, in which the electric controlling unit includes an electric circuit, a relay in said circuit connected to the oscillative magnetic pilot compass, which relay is responsive to the oscillations of said pilot compass; and a solenoid-operated mercury switch in said circuit and controlled by said relay for reversely actuating the power steering means during automatic steering of the craft to thus impart continuous oscillations to the craft rudder.

12. The combination as defined in claim 8, in which the electric controlling unit includes an electric circuit, a sensitive relay in said circuit connected with the oscillative magnetic pilot compass for activation by the oscillations of the latter; and a back contact relay in said circuit activated and deactivated by said sensitive relay for reversely actuating the power steering means during automatic steering of the craft to thus impart continuous oscillations to the craft rudder.

13. The combination as defined in claim 8, in which make and break contacts are carried by the oscillative magnetic pilot compass and are connected to the electric controlling unit for reversely activating the latter when alternately opened and closed by the oscillations of said compass.

14. The combination as defined in claim 8, in which the oscillative magnetic pilot compass is electrically oriented and the electric controlling unit includes an electric circuit, and a pair of selector switches in said circuit, each of said switches having a neutral position, a closed compass position for effecting compass orientation and a closed steering position for effecting automatic activation of the power steering means of the craft.

15. The combination as defined in claim 8, in which the oscillative magnetic pilot compass includes a reversible compass orienting motor and the electric controlling unit includes an electric circuit, a pair of selector switches in said circuit, each of said switches having a neutral position, a closed motor position for effecting activation of said orienting motor and a closed steering position for effecting automatic activation of the power steering means of the craft; and a tell-tale light in said circuit for each of said selector switches.

16. The combination as defined in claim 8, in which the electric controlling unit also includes an electric circuit, and a pair of push button two point make switches in said circuit for effecting manual power steering of the craft.

CARLETON H. BOLIN.

References Cited in the file of this patent

UNITED STATES PATENTS

| Number | Name | Date |
| --- | --- | --- |
| 856,338 | Crosby | June 11, 1907 |
| 1,079,193 | Stevenson | Nov. 18, 1913 |
| 1,332,302 | Patterson | Mar. 2, 1920 |
| 1,360,325 | Simmon | Nov. 30, 1920 |
| 1,603,867 | Rogers | Oct. 19, 1926 |
| 1,818,103 | Sperry | Aug. 11, 1931 |
| 1,835,453 | Bahl | Dec. 8, 1931 |
| 2,068,065 | Neubert | Jan. 19, 1937 |
| 2,089,914 | Freeman | Aug. 10, 1937 |
| 2,095,031 | Holmes | Oct. 5, 1937 |
| 2,102,513 | Chance | Dec. 14, 1937 |
| 2,140,037 | Swisher | Dec. 13, 1938 |
| 2,337,589 | Chance | Dec. 28, 1943 |
| 2,401,771 | Nye | June 11, 1946 |